(12) United States Patent
Stahlschmidt et al.

(10) Patent No.: US 9,563,183 B2
(45) Date of Patent: Feb. 7, 2017

(54) METHOD FOR CONTROLLING THE ENERGY CIRCULATIONS IN AN OBJECT

(75) Inventors: Helmut Stahlschmidt, Constance (DE); Bjoern Kuebler, Uhldingen-Muehlhofen (DE); Markus Brandstetter, Sachsenheim (DE); Lukas Jager, Friedrichshafen (DE)

(73) Assignee: ROBERT BOSCH GMBH, Stuttgart (DE)

(*) Notice: Subject to any disclaimer, the term of this patent is extended or adjusted under 35 U.S.C. 154(b) by 604 days.

(21) Appl. No.: 13/884,555

(22) PCT Filed: Sep. 13, 2011

(86) PCT No.: PCT/EP2011/065793
§ 371 (c)(1),
(2), (4) Date: Sep. 9, 2013

(87) PCT Pub. No.: WO2012/062498
PCT Pub. Date: May 18, 2012

(65) Prior Publication Data
US 2013/0345831 A1    Dec. 26, 2013

(30) Foreign Application Priority Data

Nov. 10, 2010    (DE) .................... 10 2010 043 676

(51) Int. Cl.
*G06G 7/62*    (2006.01)
*G05B 13/02*    (2006.01)
(Continued)

(52) U.S. Cl.
CPC .............. *G05B 13/02* (2013.01); *F24D 19/10* (2013.01); *G05B 15/02* (2013.01); *H02J 3/14* (2013.01);
(Continued)

(58) Field of Classification Search
CPC .............. G06F 17/5022; G06F 17/5009; G06F 17/5036; H04L 41/145; G05B 17/02
(Continued)

(56) References Cited

U.S. PATENT DOCUMENTS

2002/0082747 A1    6/2002    Kramer
2003/0233201 A1    12/2003   Horst et al.
(Continued)

FOREIGN PATENT DOCUMENTS

CN    201797324    4/2011
DE    195 49 455    6/1997
(Continued)

OTHER PUBLICATIONS

Arnold, M. [et al.] : Distributed Control Applied to Combined Electricity and Natural Gas Infrastructures.
(Continued)

*Primary Examiner* — Saif Alhija
(74) *Attorney, Agent, or Firm* — Norton Rose Fulbright US LLP; Gerard Messina

(57) ABSTRACT

A method and information model for carrying out the method are used to control the energy circuits of an object using a generic information model that includes at least one generic unit or generic device that is connected to the energy circuits, the at least one device being assigned to a control unit for each energy circuit, and a device matrix being assigned to the at least one device, in which matrix an energy flow of at least one of the energy circuits is described as a function that includes as a parameter at least one energy flow of at least one of the other energy circuits.

12 Claims, 3 Drawing Sheets

(51) Int. Cl.
*G05B 15/02* (2006.01)
*H02J 3/14* (2006.01)
*F24D 19/10* (2006.01)
*H02J 3/00* (2006.01)

(52) U.S. Cl.
CPC .. *G05B 2219/2642* (2013.01); *H02J 2003/007* (2013.01); *H02J 2003/146* (2013.01); *Y02B 30/762* (2013.01); *Y02B 70/3225* (2013.01); *Y02B 70/3241* (2013.01); *Y02B 70/3275* (2013.01); *Y04S 20/222* (2013.01); *Y04S 20/224* (2013.01); *Y04S 20/227* (2013.01); *Y04S 20/244* (2013.01)

(58) Field of Classification Search
USPC .......................................................... 703/17
See application file for complete search history.

(56) References Cited

U.S. PATENT DOCUMENTS

2009/0004516 A1    1/2009  Bai et al.

2009/0062969 A1*   3/2009  Chandra ................ G06Q 10/06
                                                            700/291

FOREIGN PATENT DOCUMENTS

WO    2007/096377    8/2007
WO    2008/014562    2/2008

OTHER PUBLICATIONS

Arnold, M. [et al.] : Distributed Predictive Control for energy Hub Coordination in Couples Electricity and Gas Networks. In : Intelligent Systems, control and Autmation : Science and Engineering, 2009, S. 235-273.

Groscurth, H.M. (et al.), "Modeling of Energy-Services Supply Systems", Jan. 26, 1995, Energy, vol. 20, No. 9, pp. 941-958, 1995.
Arnold, M. [et al.] : Distributed Control Applied to Combined Electricity and Natural Gas Infrastructures (2008), pp. 1-6.

* cited by examiner

METHOD FOR CONTROLLING THE ENERGY CIRCULATIONS IN AN OBJECT

FIELD OF THE INVENTION

The present invention relates to a method for controlling the energy circuits of an object, and to an information model for carrying out the method. The present invention further relates to a generic unit, or a generic device, and a control unit. The method is used in particular in the context of decentralized energy management.

BACKGROUND INFORMATION

Energy management includes the planning and the operation of units related to energy technology. The goal of energy management is to satisfy the energy requirements of the user, and in particular to realize a cost-efficient and material-efficient energy supply.

In so-called decentralized energy management, the active controlling of the components of an energy circuit of an arbitrary object, such as a building or even an urban district, is supposed to be achieved in order in this way to enable the positive influencing of variables such as power costs or $CO_2$ emissions. In this context, the term "energy" refers to all forms of energy that occur, such as electric current, heat, or mechanical work. Furthermore, it is necessary for some components included in the circuit to allow an automatic controlling. In addition, the entire circuit under consideration must be suitably modeled in order to be able to anticipate the direct consequences of such influencing.

In today's related art, information models for building control technology, and information models for network control technology outside the building, are known. The two information architectures are not linked to one another, and do not cover the requirements of decentralized energy management. For example, the NIST (National Institute of Standards and Technology) makes reference to an incomplete reference list with regard to standards for the linkage of building automation and energy technology. Likewise, neither IEC (International Electrotechnical Commission) nor IEEE (Institute of Electrical and Electronics Engineers) address the integration of the various systems in the building, such as climate control, heating, mechanical work, electric power, light, etc. These named standards, like other previously known standards, do not provide an approach to modeling.

Patent document US 2002/0082747 A1 discusses an energy management system provided for managing the production and distribution of energy from an energy source to a building. The energy management system describes energy producers and energy consumers, the energy producers being described as producers of various forms of energy such as thermal or electrical energy. The building is understood as a consumer of energy. The aim of the presented method is in particular to distribute produced energy in a suitable manner in the building, while carrying out an optimization with regard to costs.

A method is sought by which a uniform modeling of all components of an energy circuit is possible, in order to make it possible to implement an energy management, in particular a decentralized energy management.

SUMMARY OF THE INVENTION

Against this background, a method as described herein, an information model having the features as described herein, a generic device as described herein, and a control unit as described herein are presented. Embodiments result from the descriptions herein.

Thus, a generic information model is presented for decentralized energy management applications. Building on this, the generic information element, which takes over the regulation in the decentralized energy management on the basis of the information model, is developed. Both, i.e. the information element and the associated information model, can be used in the presented method.

In comparison with such procedures, the described method enables the linkage of all systems in the building and their connection to the supply network technology. This is not limited to electrical power networks. The use of the information model permits the simple implementation of distributed information elements, which take over the tasks of communication, regulation, and energy management.

It is to be noted that the presented method can be used for the modeling of any object, e.g. of a building or of a machine, in which a plurality of energy circuits are present. The components are each modeled using a generic device to which there is assigned a device matrix in which the functional connection between the flow of one energy circuit and the flow of another energy circuit is defined. In principle, the connections between more than two energy circuits can be represented in a device matrix. Alternatively or in addition, a generic device can also include more than one device matrix.

A generic device can also model an energy storage device; here, a first energy circuit relates to the energy stored in the storage device. A further circuit relates to the energy outputted by the storage device. Here it is also possible for the two energy circuits to be identical.

Further advantages and embodiments of the present invention result from the description and from the accompanying drawings.

Of course, the features named above and those explained below may be used not only in the respectively indicated combination, but also in other combinations or alone without departing from the scope of the present invention.

DETAILED DESCRIPTION

Figure 1:
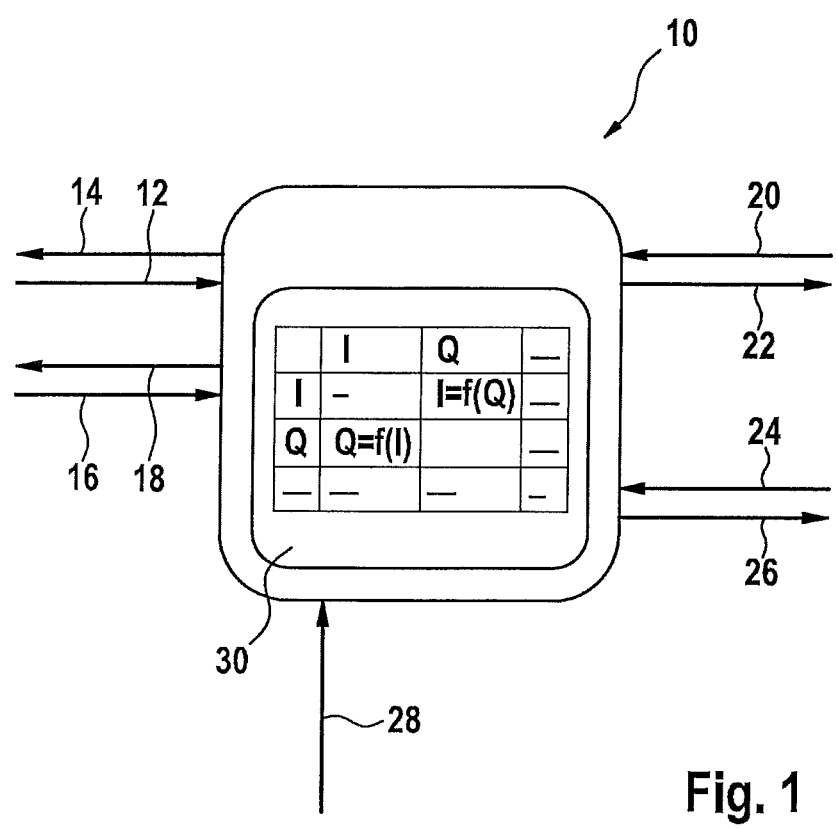
FIG. 1 shows a specific embodiment of the presented generic device.

The exemplary embodiments and/or exemplary methods of the present invention are schematically presented on the basis of specific embodiments in the drawings, and is described in detail below with reference to the drawings.

FIG. 1 shows a specific embodiment of a generic unit, or a generic device, as a component of the presented information model, and is designated overall by reference character 10. An arrow 12 indicates an input quantity, electric current I or power (I), and a further arrow 14 indicates an output quantity, electric current I. In addition, a heat flow Q or heat (Q) (arrow 16) is an input quantity, and a heat flow Q (arrow 18) is an output quantity.

A further input quantity, in this case an event input from a user or from a control unit, is indicated by an arrow 20. A further output quantity, namely an event output to the control unit, is identified by an arrow 22. Moreover, a further input quantity, namely Public Device Data (in), is indicated by an arrow 24, and a further output quantity, namely Public Device Data (out) is indicated by an arrow 26. Finally, an arrow 28 indicates a further input quantity for oil, gas, etc.

In generic device 10, there is contained an internal control 30 in which the measurement values of I and Q are monitored.

The device matrix is a component of internal control 30. Internal control 30 monitors e.g. the parameters, and, using the functions from the device matrix, calculates the energy flows in the circuits.

It is to be noted that a central component of the presented method is the description of the energy conversion between the various actual energy flows in the decentralized energy management. For this purpose, as a basis the information model for the generic unit or generic device is provided, as is shown as an example in FIG. 1.

Generic device 10 includes all attributes and transactions that can occur during the energy conversion.

In this way, all components taking part in the energy circuit can be modeled using generic device 10. Outwardly, a device is distinguished by its inputs and outputs to the various energy circuits, such as current or heat. It can have arbitrarily many inputs or outputs to arbitrarily many circuits. Thus, a heating system is connected both to the current circuit and to the heat circuit. An additional possible supply to the device from outside is represented by primary energy sources such as oil or gas. Thus, an oil heating system has a supply of primary energy in the form of oil.

The difference between the connections to the energy circuits and the supply of primary energy is that the supply of primary energy can be controlled independently of each device, while the flows in the energy circuits are a function of the requirements of all devices, and are then to be optimized, just as the use of primary energy is. The third connection of a device to the outside is represented by the communication channels (arrows 20 and 22) that are used to communicate control signals and status messages. Direct interaction with a human being, such as the operation of an on/off switch, is also modeled by these channels.

Moreover, it is possible for devices to exchange data with one another in order for example to access data from sensors. For this purpose, device 10 can make some of its data publicly available, and can read data from other devices that has been made public (arrows 24 and 26).

However, device 10 is not yet completely modeled by its external connections. The effect that changes to one parameter have on all the other parameters is essential to participation in the circuits. This relation is represented by the device matrix shown in the following Table 1.

TABLE 1

|   | I | Q |
|---|---|---|
| I | — | $I = f(Q; \phi; t, \ldots)$ |
| Q | $Q = f(I; \phi; t, \ldots)$ | — |

The device matrix represents the functional connection between the flow of one circuit and the flow of another circuit through the corresponding device. In addition, functional relationships to the primary energies that are present (in the matrix shown, designated with parameter $\phi$), and further parameters such as time t or sensor data such as temperature T, may also be present.

The energy flow of the device in a circuit is thus described by a function that contains as parameters the flows of the device in the other circuits, and further parameters. Thus, it is possible, when there is a change in a parameter, to calculate the effects on the device and thus on the circuits that are involved. An electrical heating system may serve as an example. This produces heat from electric current. If the functional relationship for this heating system is known, then it can be calculated how a change in the power consumption will affect the produced quantity of heat. Here, a time dependence is for example given in that the produced quantity of heat adapts itself to the power consumption, with a certain delay.

Another example of a functional relationship of time dependence is presented by a washing machine that requires a certain amount of power depending on how far it has progressed in its washing program. Moreover, the washing machine is an example of a device matrix having only one column and line, because it participates only in the power circuit. Only the functional relationship between power consumption and other parameters, such as time, is then of interest.

Furthermore, device 10 includes internal control 30. This is used to monitor the relevant measurement values and to react in a suitable manner if necessary. This can for example be a simple timing circuit, or can be a monitoring of the room temperature, so that when defined boundary values are exceeded or fallen below, device 10 can display its new requirement status.

With generic device 10, not only actually existing terminal devices but also abstract components, such as a room or an entire building, can be modeled. In this way, the generic information model enables an arbitrarily granular modeling of the overall circuit, and also the inclusion of external conditions through abstract devices.

An example of an abstract device is an office room. This room uses heat and electric power. The heat consumption is a function not only of the power consumption but also of the number of people in the office, the time of day and time of year, incoming sunlight, and above all the desired temperature in the office. Likewise, the electric power requirement is a function of, for example, the time of day, utilization, and date. This can be modeled to an arbitrary degree of precision by the generic device.

Besides generic device 10, the control unit is the second central component of the generic information model. The control unit is responsible for the monitoring and controlling of the devices that permit this. It is connected to the devices via the communication channels, and can send and receive events over these channels. The events sent by the control unit are used on the one hand for status querying, and on the other hand for communicating control signals. The devices send events to the control unit in order to indicate a change in their status.

An important component of the control unit is the control algorithm responsible for the allocation of the resources in the circuit. Its specific implementation is not specified by the generic information model. As an input, the algorithm uses standardized items of information about the requirements of the devices and, if warranted, further parameters such as corridors for the power consumption and price information.

With the generic device and the control unit, the energy circuit of an arbitrary object can be modeled. Here, both arbitrarily many devices and arbitrarily many control units are permitted. Each device is assigned to exactly one control unit for each circuit to which it is connected. Arbitrarily many devices can be assigned to the control units. There is at least one control unit per circuit of a particular energy form. Input quantities are, in principle, conjugated quantities. In the devices, functions and attributes are described and are stored in parameterizable form. Control units are in principle implemented in software.

Between the generic device and the control unit, a uniform interface can be provided. Three methods can be provided per form or type of energy, such as electric power, heat, etc. These are designated as follows:

getLoadOffers offer of the device to the control unit
setLoad control unit gives acceptance for one of the offers
getCurrentLoad actually measured power, required or supplied at that moment Events can be:
loadOffersChanged device indicates that its status has changed, so that the control unit can use getLoadOffers to query the new offers.
currentLoadChanged device indicates that the measured power has changed, so that the control unit can use getCurrentLoad to query the power.

All further communication of the device, for example with the user interface, the physical devices, etc., is device-specific.

An offer (LoadOffer) is made up of:
EnergyType power, heat, cooling, etc.
(Energy-)Profile predicted energy consumption or production
TimeCondition time specification (when, how long?)
Weight weighting (price, $CO_2$ consumption, priority)

A device can output a plurality of such offers to the control unit. The control unit then decides which offer is accepted and under which conditions (starting time, runtime).

As an illustrative example, in the following a photovoltaic system is considered.

Sunshine is predicted for the next two hours. Therefore, the device can for example make the following offers:

Full power (profile=e.g. 10 kW); start: possible immediately; runtime: up to two hours; priority: very high.

80% power (by shifting the operating point of the rectifier); start and runtime as above; priority: low.

60% power (by shifting the operating point of the rectifier); start and runtime as above; priority: very low.

0% power (off); start and runtime as above; priority: lowest.

Figure 2:
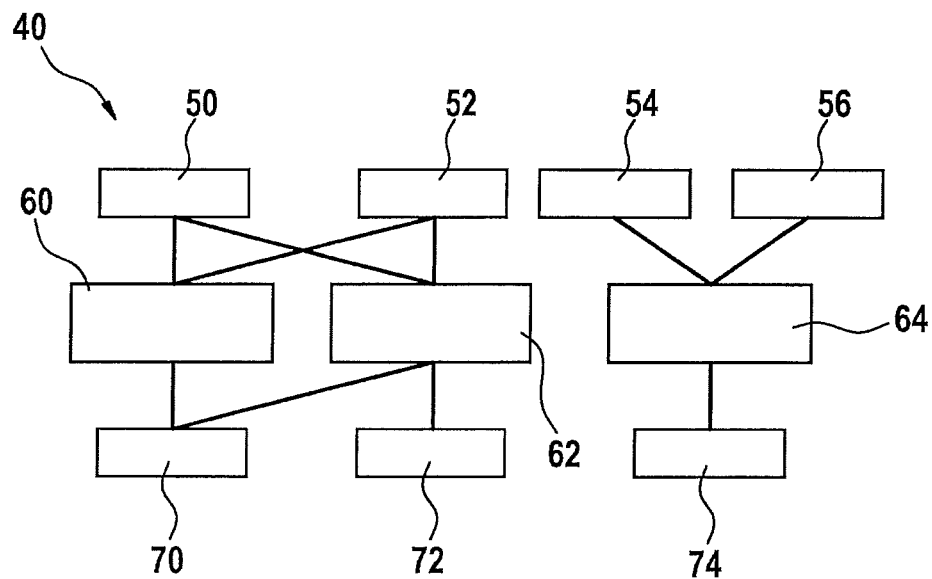
FIG. 2 shows a modeling of an energy circuit.

FIG. 2 shows an example of a modeled overall circuit or energy circuit 40. The representation shows as devices a first office 50, a second office 52, a first block 54 for light on the ground floor, a second block 56 for light in the upper floor, a first control unit 60 for heat, a second control unit 62 for electric power, a third control unit 64 for electric power, a heating system 70, a washing machine 72, and a third block 74 for outside lighting.

In the modeled energy circuit 40, there are one heat circuit and two separate electric power circuits. For clarity, here only the associations of the devices to the respective control units are shown. This implicitly indicates the associations to the energy circuits. Functional relationships between the devices and primary energies are not shown in this representation. A connection between two circuits comes about either through devices that participate in both circuits, or one of the circuits presents itself to the other as a single abstract device. This is a central property of the generic information model. For the controlling of a circuit, only information of the directly assigned devices is necessary. Functional relationships between the circuits must be modeled on the level of the devices.

As a rule, in the generic information model the communication takes place between a device and a control unit. Neither devices nor control units can communicate with each other, with the exception that devices can access released parameters of another device, in order for example to obtain the measurement value of a sensor. The communication takes place via events, i.e., in contrast to communication at regular intervals, an event is triggered by a particular situation, i.e. a constellation of the parameters. These events are device-independent, but can differ between the various circuits. In this way it is ensured that the control algorithm can be implemented independently of the connected devices, and all devices implement the same communication interface, i.e. are suitably abstracted outwardly.

Figure 3:
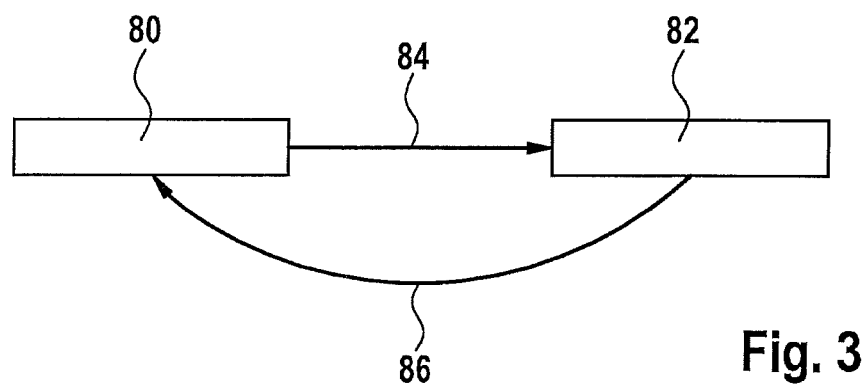
FIG. 3 shows a control cycle for an energy circuit.

FIG. 3 schematically shows a control cycle of the energy circuit. The representation shows a stable state 80 and a disturbed state 82. Transitions between the two states 80 and 82 are a change of requirement (arrow 84) and an allocation of resources (arrow 86).

The goal of the controlling is to adjust the requirements, both positive and negative, of all devices in such a way that the flow in the overall circuit meets particular conditions, such as for example that the overall power consumption should not be greater than a specified maximum value. This is achieved in that the control algorithm distributes the existing resources to the devices in a suitable manner, and then sends corresponding control signals to the devices. Once this has taken place, the circuit is in a stable state as long as the requirements of the devices or the external specifications do not change.

In principle, a new regulation of the circuit is therefore necessary only when the internal logic of a device, triggered by a change in its parameters sends the control unit a new requirement request. Therefore, the controlling functions in an event-driven manner. A device signals a changed requirement to the control unit. The control algorithm makes a new distribution of the existing resources, and sends control signals to those devices whose state is to change. Subsequently, the overall circuit is again in a stable state.

The regulating circuit of the generic information model describes the momentary or instantaneous reaction of the system to a changed requirement or resource situation in order to make it possible to constantly maintain the specified limitations. This does not exclude other mechanisms for controlling and monitoring the overall circuit, in particular prognoses and prior planning. Rather, the unification of the control and monitoring events ensures homogeneity and thus the administrability and expandability of the system.

The controlling inside the device is illustrated on the basis of a lighting system.

The implementation of the lighting system as generic device includes the logic for the actual interaction with the physical lighting system. The lighting system is connected for example through KNX, which is a current building automation technology, can be reached via an IP gateway in the network, and offers an interface via which various lighting scenarios can be switched on. Possible scenarios include for example: all off, all on, emergency lighting, normal night lighting, etc.

If the control unit gives acceptance of an offer, e.g. with full power, then the device implementation, via the KNX interface, switches the lighting system to "all on" at the time at which the offer is to be started.

The device implementation knows which actions, e.g. switching processes, are necessary for each offer.

Figure 4:
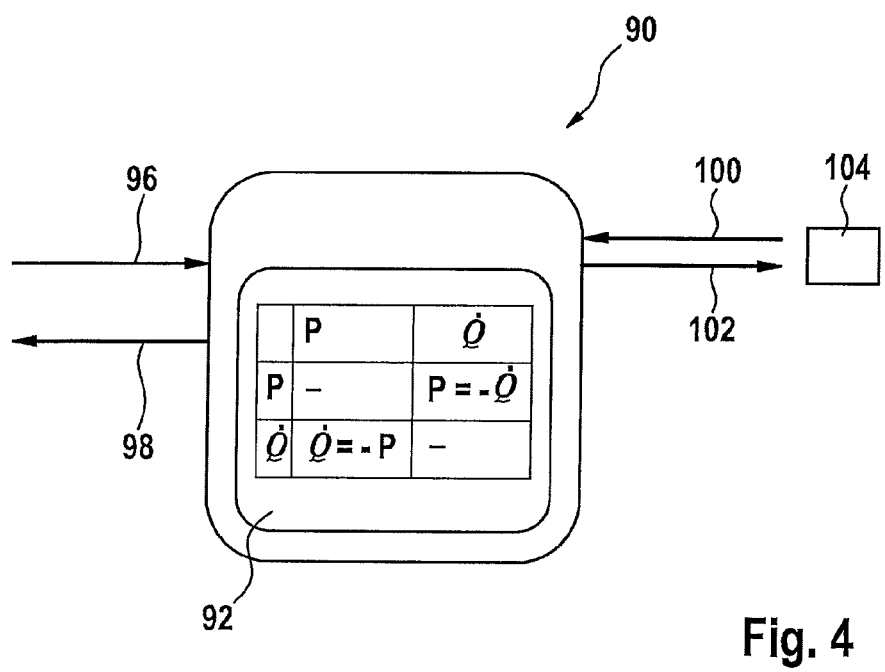
FIG. 4 shows a further embodiment of the generic device.

FIG. 4 shows a generic device 90 for an electric heating system, having an internal control 92 and a device matrix 94. Input quantity 96 is the electrical power P (Power (P)), and output quantity 96 is the thermal power $\dot{Q}$ (=dQ/dt) (Heat (Q̇)). In addition, a bidirectional communication with a control unit 104 takes place (arrows 100 and 102). The electrical heating system consumes electrical energy and produces heat. The relation between produced heat and consumed electric power is thus −1. Therefore the following holds: $P=-dQ/dt$ The (power) profile of the offers for the two types of energy are thus identical in this case, except for the sign.

What is claimed is:

1. A method for controlling energy circuits of an object, the method comprising:
   providing, via a processor arrangement, an information model that includes at least one unit or device, which is connected to the energy circuits, wherein the at least one unit or device is assigned to a control unit for each of the energy circuits, wherein a matrix is assigned to the at least one unit or device;
   describing, via a processor arrangement, in the matrix, an energy flow of at least one of the energy circuits as a function, which includes as a parameter at least one energy flow of at least one of the other energy circuits;
   at least one of inputting and outputting data concerning events; and
   at least one of inputting and outputting public device data;
   wherein the energy flow includes heat flow,
   wherein the matrix, which is processed by the processor arrangement, represents the functional connection between the flow of one of the energy circuits and the flow of another of the energy circuits through the device, and
   wherein the matrix includes a current or power, which is a function of at least a heat flow, a parameter, and time, and wherein the matrix includes the heat flow, which is a function of at least the current or power, the parameter, and the time.

2. The method of claim 1, wherein the energy circuits are regulated.

3. The method of claim 1, wherein the at least one unit or device includes a plurality of units or device that exchange data among one another.

4. An information model apparatus for controlling energy circuits of an object, comprising:
   a processor arrangement including an information model, which includes at least one unit or device that is connected to the energy circuits, the at least one unit or device being assigned to a control unit for each of the energy circuits, a matrix being assigned to the at least one device, in which matrix an energy flow of at least one of the energy circuits is described as a function that includes as a parameter at least one energy flow of at least one of the other energy circuits;
   wherein data concerning events is at least one of input and output,
   wherein public device data is at least one of input and output,
   wherein the energy flow includes heat flow,
   wherein the matrix, which is processed by the processor arrangement, represents the functional connection between the flow of one of the energy circuits and the flow of another of the energy circuits through the device, and
   wherein the matrix includes a current or power, which is a function of at least a heat flow, a parameter, and time, and wherein the matrix includes the heat flow, which is a function of at least the current or power, the parameter, and the time.

5. The information model of claim 4, further comprising:
   an internal control arrangement for monitoring measurement values.

6. A device, for use with an information model, comprising:
   at least one device connected to energy circuits of an object, the at least one device being assigned to a control unit for each of a plurality of energy circuits, a matrix being assigned to the at least one device, in which matrix an energy flow of at least one of the energy circuits is described as a function that includes as a parameter at least one energy flow of at least one of the other energy circuits;
   wherein data concerning events is at least one of input and output,
   wherein public device data is at least one of input and output,
   wherein the energy flow includes heat flow,
   wherein the matrix, which is processed by the control unit, represents the functional connection between the flow of one of the energy circuits and the flow of another of the energy circuits through the device, and
   wherein the matrix includes a current or power, which is a function of at least a heat flow, a parameter, and time, and wherein the matrix includes the heat flow, which is a function of at least the current or power, the parameter, and the time.

7. A control unit, for use with an information model, comprising:
   a control arrangement, to which at least one device is assigned for each of a plurality of energy circuits, the at least one device being connected to the energy circuits of an object, a matrix being assigned to the at least one device, in which matrix an energy flow of at least one of the energy circuits is described as a function that includes as a parameter at least one energy flow of at least one of the other energy circuits;
   wherein data concerning events is at least one of input and output,
   wherein public device data is at least one of input and output,
   wherein the energy flow includes heat flow,
   wherein the matrix, which is processed by the control arrangement, represents the functional connection between the flow of one of the energy circuits and the flow of another of the energy circuits through the device, and
   wherein the matrix includes a current or power, which is a function of at least a heat flow, a parameter, and time, and wherein the matrix includes the heat flow, which is a function of at least the current or power, the parameter, and the time.

8. The control unit of claim 7, wherein the control arrangement includes software.

9. The method of claim 1, wherein communication takes place via the events, which are triggered by a particular set of parameters, and wherein the events are device-independent.

10. The information model apparatus of claim 4, wherein communication takes place via the events, which are triggered by a particular set of parameters, and wherein the events are device-independent.

11. The device of claim 6, wherein communication takes place via the events, which are triggered by a particular set of parameters, and wherein the events are device-independent.

12. The control unit of claim 7, wherein communication takes place via the events, which are triggered by a particular set of parameters, and wherein the events are device-independent.

\* \* \* \* \*